Oct. 27, 1953 W. BRANDT 2,657,308

SIGNAL RECEIVER CIRCUIT

Filed July 29, 1950 2 Sheets-Sheet 1

INVENTOR
WALTER BRANDT
BY Percy P. Lantzy
ATTORNEY

INVENTOR
WALTER BRANDT
BY Percy P. Lantzy
ATTORNEY

Patented Oct. 27, 1953

2,657,308

UNITED STATES PATENT OFFICE 2,657,308

SIGNAL RECEIVER CIRCUIT

Walter Brandt, Jersey City, N. J., assignor to Federal Telephone and Radio Corporation, New York, N. Y., a corporation of Delaware Application July 29, 1950, Serial No. 176,749

2 Claims. (Cl. 250—27)

This invention relates to signal receiving and control circuits for telephone exchange equipment and more particularly to a pulse signal discriminating and shaping circuit for use in this and other types of equipment.

In telephone dialing at a substation, actuation of the dial transmits pulses to operate the exchange equipment to complete a line to the station being called by the number dialed. If the pulse-space ratio, often referred to as the "pulse ratio," of the dialed pulses differs or varies from a given ratio the exchange relays and/or line finder equipment of the exchange may not operate properly to complete the desired connection. While ratio meters are employed for adjusting dial mechanism, transmission and receiver equipment may introduce sufficient distortion in the pulse signals as to cause improper exchange operation. Also, should voice signals or other spurious signals of short duration be picked up by the receiver equipment, such signals may cause erroneous operation of the exchange.

One of the objects of this invention is to provide a pulse signal discriminating and/or control circuit to eliminate spurious short duration signals in preference for dial pulses of a predetermined longer duration; another object is to provide a circuit for reshaping pulse signals; and a further object is to make such circuits adjustable to determine the duration of the output pulse signals in relation to the duration of input pulse signals.

Briefly, one of the features of this invention is to provide a circuit having a short time constant in one direction and a longer time constant in the other direction. This relationship of time constant circuits is used for pulse signal discrimination in that pulses of duration less than a predetermined time interval are discriminated against, the circuit operating only in response to those pulses of duration longer than said predetermined time interval.

Another feature of the invention is the adjustability of the control circuit whereby the output pulse duration or pulse-to-space ratio may be adjusted up or down with respect to the pulse duration or pulse-to-space ratio of the input pulses should the source of input pulses be lacking in desired pulse-to-space ratio.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
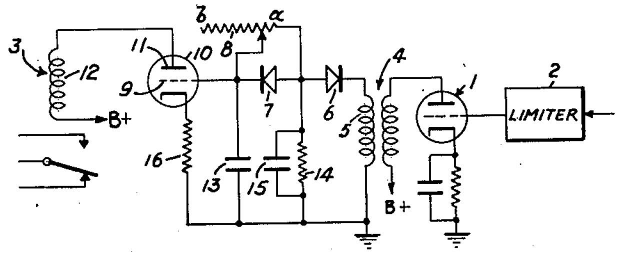
Fig. 1 is a schematic circuit diagram embodying the principles of the present invention.

Fig. 1 shows one form of control circuit which includes, at the input thereof, the last amplifier stage 1 of a receiving circuit which includes a limiter 2 and, at the output thereof a control relay 3 for actuating certain contacts in telephone exchange equipment or other apparatus with which the control circuit may be associated. The control circuit of the invention is coupled to the amplifier stage 1 through a transformer 4, the secondary coil 5 of which is connected to a rectifier 6 so as to produce in response to input carrier pulses a negative direct current potential. Connected back-to-back with rectifier 6 is a second rectifier 7, across which is connected a potentiometer 8 which in turn is connected to the control grid 9 of an electron discharge tube 10. The anode 11 of tube 10 is connected through the coil 12 of relay 3 to a B supply. The tube 10, in absence of a blocking potential on grid 9, normally conducts to maintain relay 3 in one operative position. A capacitor 13 is connected between the terminal of the grid 9 and ground whereby the negative potential produced by rectification of an input carrier signal is stored for application to control grid 9. A resistance-capacitance net work 14, 15 is connected in circuit at a point between rectifiers 6 and 7 and ground. This net work 14, 15 is selected to have a small time constant for two reasons, one being to integrate the output of rectifier 6 and the other to discharge rapidly the charge on capacitor 13 upon termination of the input pulse signal. This rapid discharge occurs through rectifier 7 which shorts potentiometer 8 in the reverse direction as soon as the input signal terminates.

The negative voltage received from rectifier 6, or other source, if desired, is applied through potentiometer 8 to the grid 9 and the storage capacitor 13. The time constant of the combination of the resistance of potentiometer 8 and capacitor 13 is preferably long compared to the time constant of the net work 14, 15 so that the amplitude of the negative potential on grid 9 depends to a large extent on the duration of the input pulse, that is to say, the input pulse must be of a given duration in order to build up on capacitor 13 and grid 9 sufficient negative potential, before termination of the pulse, to block operation of the tube 10. Thus, while tube 10 operates in the absence of a blocking potential on grid 9 to maintain the relay 3 in a first contact actuating position, the application of a blocking potential to grid 9 of tube 10 causes relay 3 to move to a second contact actuating position.

Figure 2:
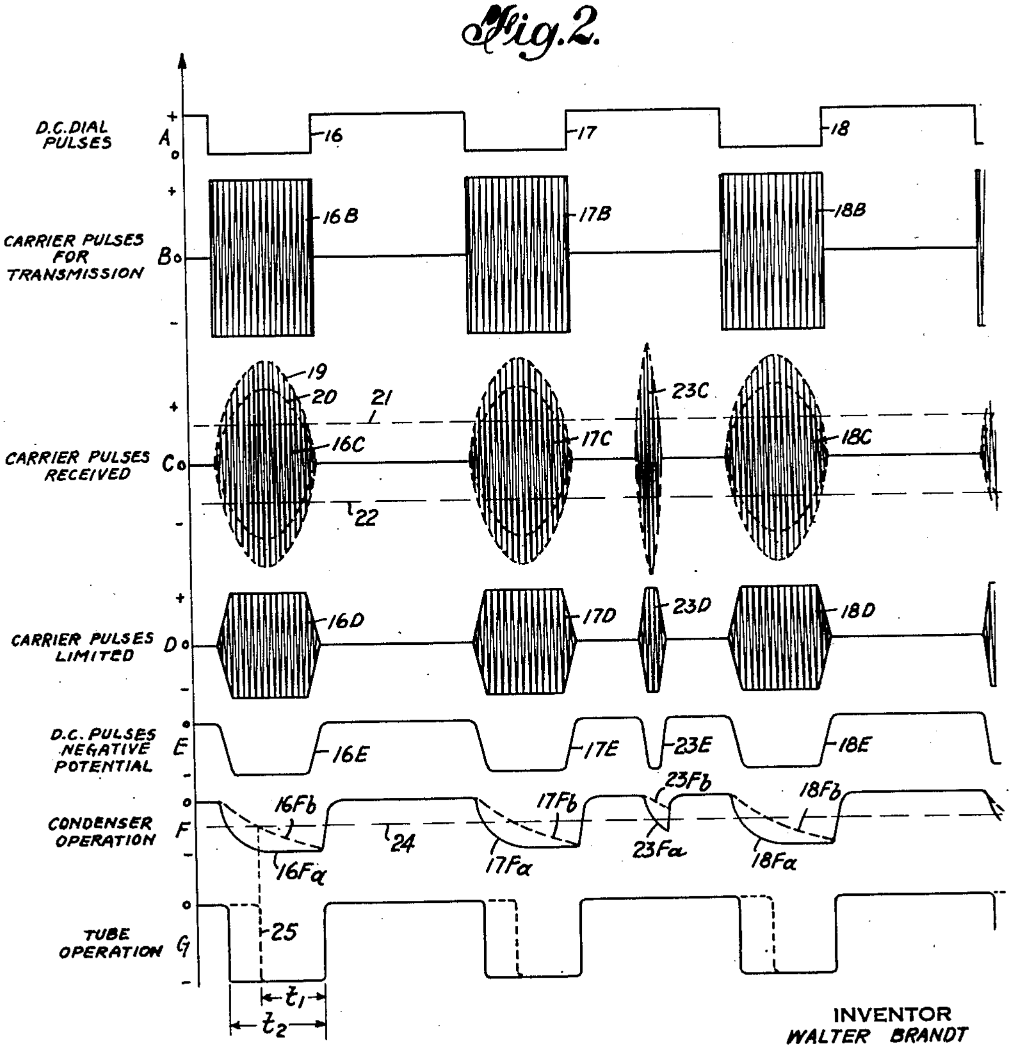
Fig. 2 is a graphical diagram useful in explaining the operation of the circuit of Fig. 1.

Referring to Fig. 2 in conjunction with Fig. 1, the operation of the control circuit for the relay may be described as follows: Graph A represents a train of D. C. dial pulses 16, 17, 18, etc., produced by the breaker contacts in the dial mechanism during a dialing operation. These pulses preferably have a given pulse-to-space ratio of approximately 40 to 60. Graph B represents a train of carrier pulses 16B, 17B and 18B resulting from modulation of a carrier by pulses 16, 17 and 18. The pulses 16C, 17C and 18C of graph C represent the carrier pulses after transmission, the broken lines 19, 20 representing variations in the attenuation to which the pulses may be subjected during transmission over different transmission apparatus and lines to which the carrier links may be applied. The broken lines 21, 22 represent the limit levels of limiter 2 in the receiver circuit in Fig. 1. Pulses 16D, 17D and 18D represent the carrier pulses after the limiting operation of limiter 2 and, by way of simplicity may also be regarded as the output of amplifier 1.

In addition to the received pulses 16C, 17C, 18C etc., there may be occasional spurious high frequency pulses of short duration within the carrier frequency band, such as indicated at 23C. Each such pulse 23C is likewise limited and amplified resulting in pulse 23D. These output carrier pulses, 16D, 17D, 18D and 23D of amplifier 1 are rectified at 6 so as to produce a train of negative D. C. pulses 16E, 17E, 18E and 23E as indicated by graph E. It should be noted, however, that should the pulse signals from amplifier 1 or other source be of negative potential, the rectifier 6 may then be omitted.

The negative D. C. pulses, such as indicated in graph E, are applied to capacitor 13 and control grid 9 through potentiometer 8, the rectifier 7 being so disposed as to block conduction therethrough in the direction of capacitor 13. The potentiometer 8 is adjustable between *a* and *b* to control the charging rate of the capacitor 13 so that the resulting negative potentials applied to control grid 9 in response to input pulse signals, see graph E, are represented for position *a* of potentiometer 8 by corresponding pulses 16F*a*, 17F*a*, 18F*a* and 23F*a*, graph F. For position *b* of potentiometer 8, the pulses have a slower build up as indicated at 16F*b*, 17F*b* and 18F*b* and 23F*b*. Also represented on graph F is a blocking potential level 24 for the tube 10. From graph F it will be readily apparent that the tube 10 may be blocked by proper adjustment of potentiometer 8 for the major portion of the duration of pulses 16F*b*, 17F*b* and 18F*b*, while the pulse 23F*b* is of insufficient amplitude to block the tube. This discrimination may thus be controlled to some extent by adjustment of the potentiometer 8. The adjustability of potentiometer 8 is primarily useful, however, for changing the pulse-to-space ratio of the blocking pulses should the relay and associated exchange equipment require an adjustment of the pulse-space ratio for proper operation. This degree of adjustment of the pulse-to-space ratio is indicated in graph G by the broken line 25 showing the narrowest blocking pulse potential $t_1$ as compared to the maximum blocking pulse potential $t_2$ obtainable from input pulses of a given duration.

Figure 3:
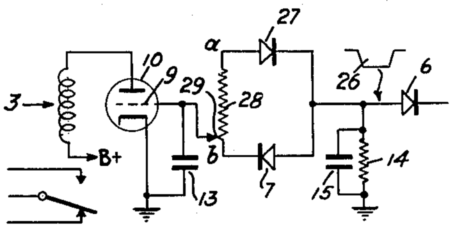
Fig. 3 is a schematic circuit diagram of a modified form of the invention.

While Fig. 1 shows a circuit by which the leading edge of the output pulse is varied so as to control the duration of the output pulse with respect to the input pulse Fig. 3 shows a circuit by which both the leading edge and the trailing edge of the output pulse may be varied. In the circuit of Fig. 1 the duration of the output pulse can be made shorter than the duration of the input pulse and in the circuit of Fig. 3 the output pulse can be made either longer or shorter than the duration of the input pulse. The circuit of Fig. 3 thus gives a wider control range by which pulse distortion may be compensated and by which the duration of pulses received from the associated automatic switching equipment may be corrected as well.

In Fig. 3 the input pulse 26 corresponds to pulse 16E of Fig. 2 while the circuit components corresponding to those of Fig. 1 are indicated by like reference characters. The difference in Fig. 3 over Fig. 1 is the provision of an additional rectifier 27 arranged in parallel with rectifier 7 with a potentiometer 28 connected to one side of both two rectifiers. The movable contact 29 of the potentiometer 28 is connected to the grid 9 of tube 10 and to the storage condenser 13 the same as in Fig. 1.

Figure 4:
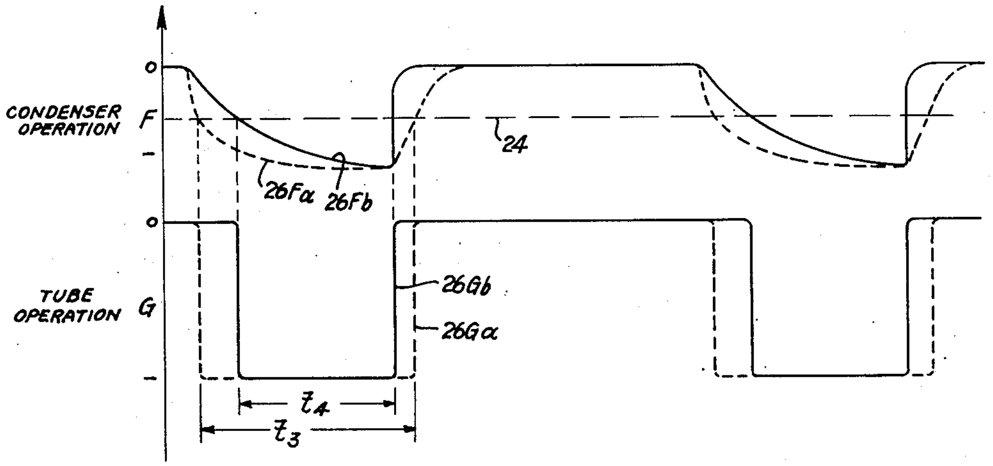
Fig. 4 is a graphical diagram useful in explaining the operation of the circuit of Fig. 3.

Referring to both Figs. 3 and 4, the input pulses 26 rectified by rectifier 6 are applied to the parallel circuit including rectifiers 7 and 27, the network 14, 15 operating as an integrating circuit of low time constant the same as in the circuit of Fig. 1.

Since the rectifier 7 is so disposed as to block conduction of the input pulses 26 in the direction of tube 10, the pulse energy must flow through rectifier 27 and potentiometer 28 for application to the storage condenser 13 and control grid 9. The position of the movable contact 29 of the potentiometer controls the charging and discharging rates of the storage condenser 13. This is illustrated in graph F of Fig. 4. When the contact 29 is at the end *a* the amount of resistance between rectifier 27 and condenser 13 is a minimum, thus permitting the condenser 13 to charge up rapidly as indicated by the broken line pulse 26F*a*. With the contact 29 in this position the discharge rate at the termination of an input pulse 26 is rendered slow by the maximum amount of resistance of the potentiometer 28 being interposed between the condenser 13 and the discharge rectifier 7. Thus the condenser operation for the *a* position of contact 29 shows a rapid build up and a slow discharge thus providing a maximum duration of blocking potential $t_3$ as compared to the minimum blocking potential $t_4$ obtainable from an input pulse of a given duration. The minimum blocking potential obtainable is indicated by the solid line pulse 26F*b* which represents the operation of the condenser 13 when the contact 29 is in the *b* position of the potentiometer 28. In this position the maximum resistance of the potentiometer is interposed between rectifier 27 and condenser 13, thus decreasing the build up time for the condenser while the discharge is reduced to a minimum because of the minimum resistance interposed between condenser 13 and discharge rectifier 7. Thus, by manipulating the contact 29 the relationship of the time constants of the circuits 27—28—13 and 13—28—7 may be adjusted in either way desired depending upon the duration of the incoming pulses and the requirements of the apparatus to be controlled thereby.

From the foregoing description it will be readily apparent that the control circuit of the present invention not only discriminates between spurious signals of short duration and desired pulses of longer duration but also reshapes for desired control of associated mechanism the input signal pulses that are received. Further, this reshaping is used to either increase or decrease pulse duration, whichever is desired. Thus, the calling signal pulses received from a substation are assured proper line selecting operation at the exchange regardless of spurious signals that may be received along with the calling signals as well as variations that may be introduced into the signal by attenuation and the characteristics of the components of the receiver.

While I have described above the principles of my invention in connection with specific apparatus, it will be clearly understood that this description is made only by way of example and not as a limitation to the scope of my invention, as set forth in the objects thereof and in the accompanying claims.

I claim:

1. A control circuit for an electron tube having cathode, grid and electrodes, said circuit comprising first and second rectifiers disposed back-to-back, a resistance-capacitance network of short time-constant connected in circuit between ground and a point intermediate one terminal of said rectifiers, an input connection for said first rectifier whereby said first rectifier is operable to produce a negative potential in response to input signals, a third rectifier poled oppositely to said second rectifier and having one terminal thereof connected to said intermediate point, a second capacitance disposed between the grid of said tube and ground, and a variable resistance shunted across the second terminals of said second rectifier and said third rectifier, respectively, said variable resistance having its movable contact connected to the grid of said tube whereby the setting of said contact alters in either direction the relationship between the time-constants of said network and the circuit made by said variable resistance and said second capacitance.

2. A control circuit for an electron tube having cathode, grid and anode electrodes, said circuit comprising first and second rectifiers disposed back-to-back, a resistance-capacitance network of short time-constant connected in circuit between ground and a point intermediate one terminal of said rectifiers, an output connection for said first rectifier whereby said first rectifier is operable to produce a negative potential in response to input signals, a second capacitance disposed between the grid of said tube and ground, and a variable resistance shunted across the second terminal of said second rectifier, said variable resistance having its movable contact connected to the grid of said tube whereby the setting of said contact alters in either direction the relationship between the time-constants of said network and the circuit made by said variable resistance and said second capacitance.

WALTER BRANDT.

References Cited in the file of this patent

UNITED STATES PATENTS

| Number | Name | Date |
|---|---|---|
| 2,061,011 | Vingerhoets | Nov. 17, 1936 |
| 2,068,293 | Ilgenfritz | Jan. 19, 1937 |
| 2,137,401 | Hobbie | Nov. 22, 1938 |
| 2,164,939 | Pfister | July 4, 1939 |
| 2,275,930 | Torcheux | Mar. 10, 1942 |
| 2,287,926 | Zepler | June 30, 1942 |